Feb. 3, 1959  M. POLOVITCH  2,871,986
AUXILIARY SAFETY BRAKING ATTACHMENT FOR MOTOR VEHICLES
Filed Dec. 6, 1956  4 Sheets-Sheet 3
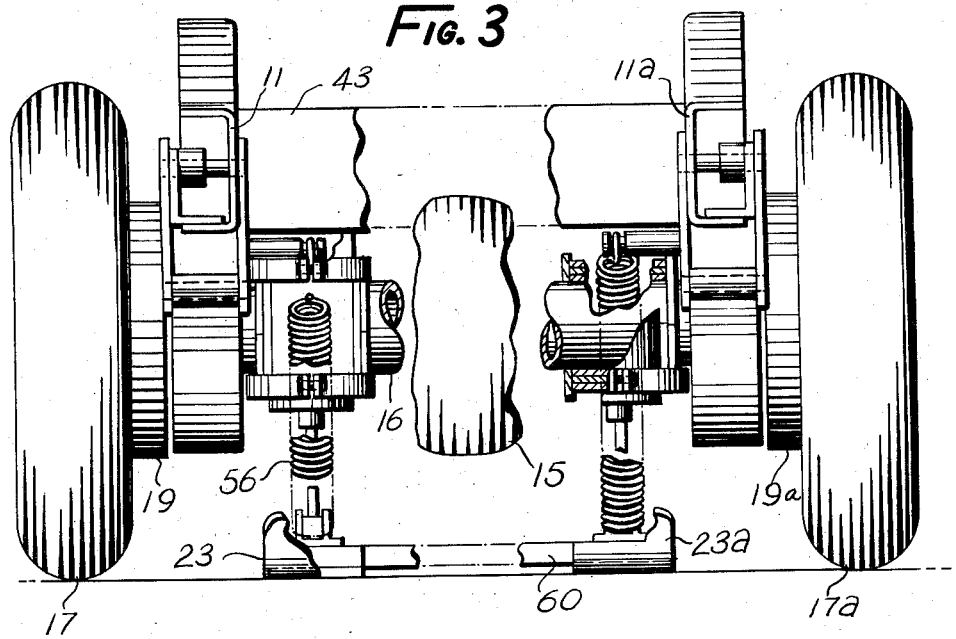
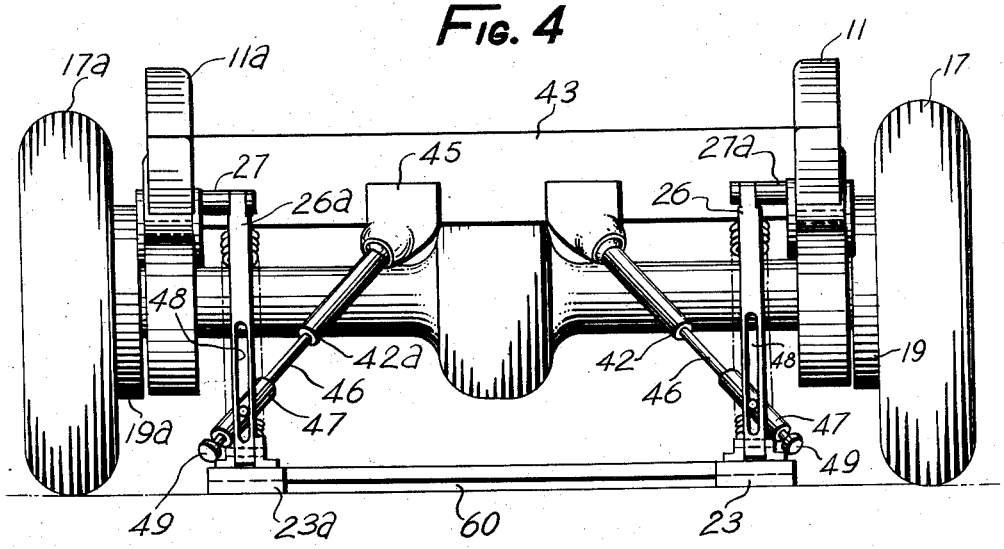
INVENTOR.
MICHAEL POLOVITCH
BY
ATTORNEY Feb. 3, 1959    M. POLOVITCH    2,871,986
AUXILIARY SAFETY BRAKING ATTACHMENT FOR MOTOR VEHICLES
Filed Dec. 6, 1956    4 Sheets-Sheet 4

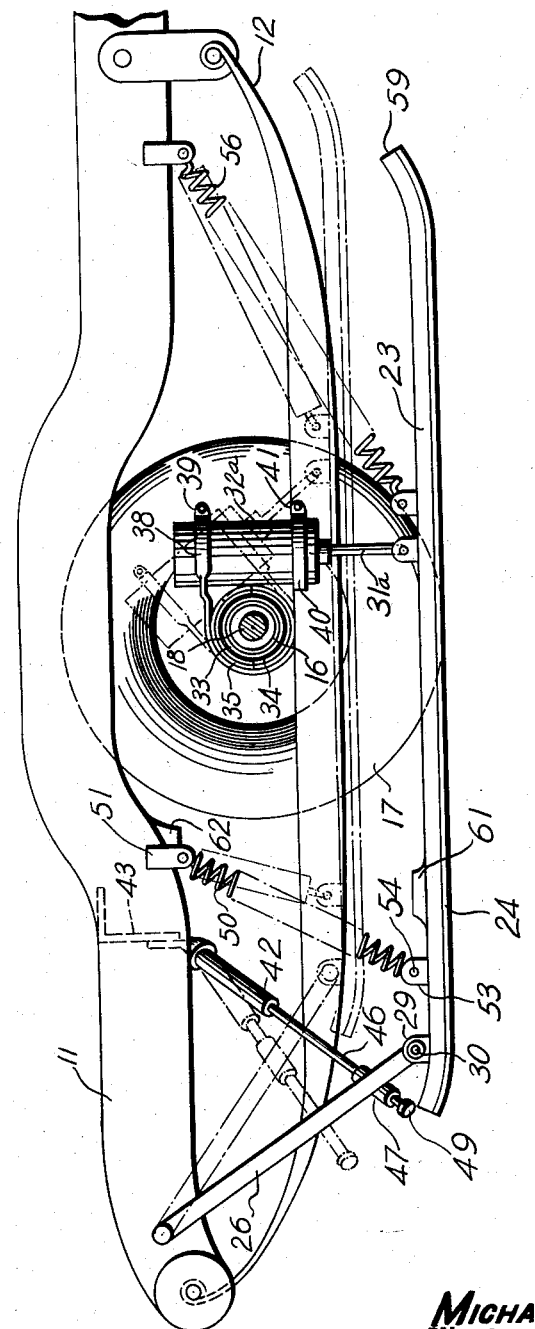

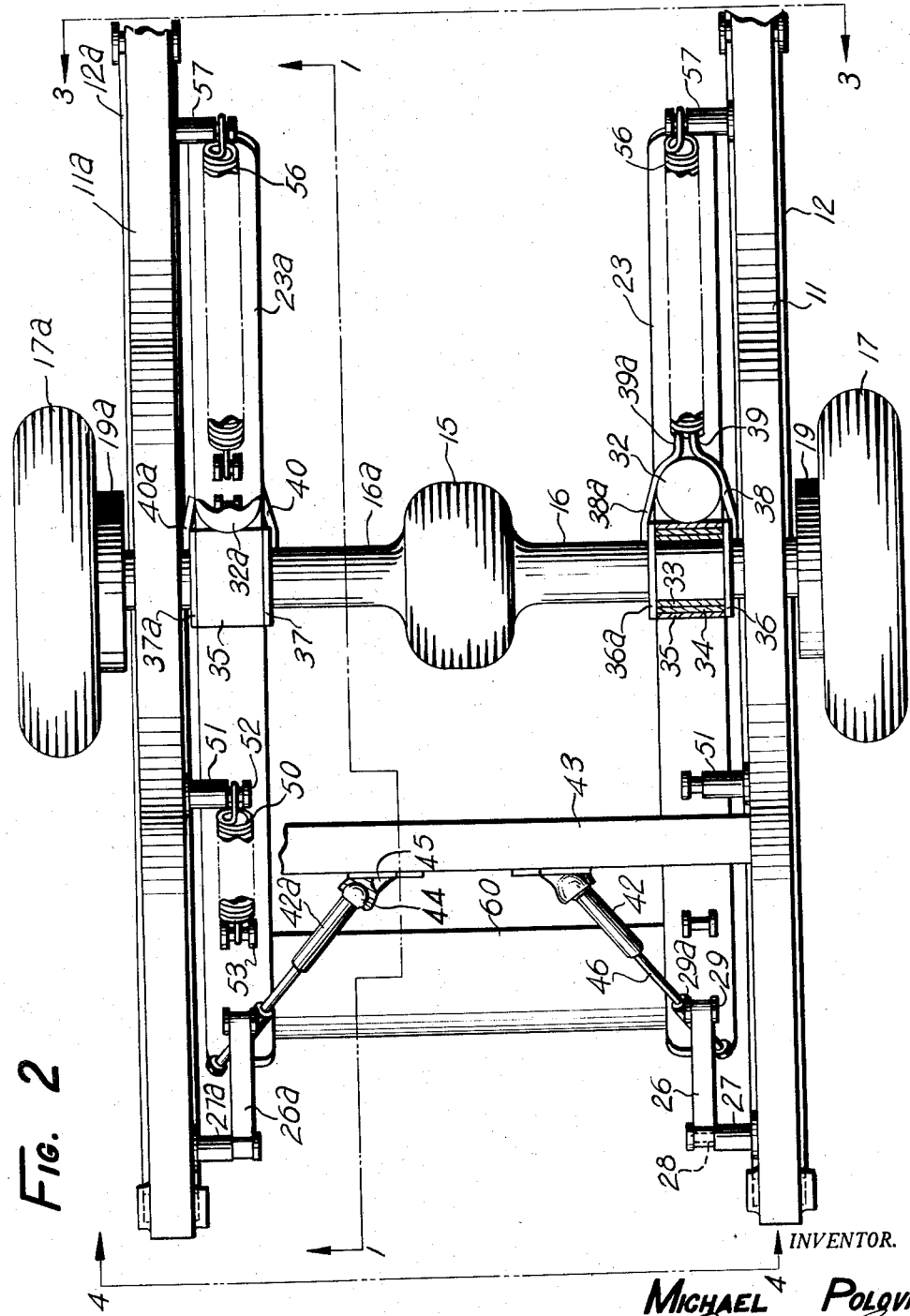

INVENTOR.
MICHAEL POLOVITCH
BY
ATTORNEY

United States Patent Office 2,871,986
Patented Feb. 3, 1959

2,871,986

AUXILIARY SAFETY BRAKING ATTACHMENT FOR MOTOR VEHICLES

Michael Polovitch, Elizabeth, N. J.

Application December 6, 1956, Serial No. 626,704

8 Claims. (Cl. 188—5)

This invention relates to motor vehicles, including passenger vehicles, motor trucks and buses, and is particularly directed to an attachment for said vehicles to facilitate braking them in emergencies.

With the present day type of motor vehicles, particularly those equipped with high powered engines, automatic transmissions of various types and low pressure tires, the braking system provided with the vehicle, such as the conventional type of hydraulic braking system, is required to function under extremely severe operating conditions, due to the fact that all the braking is applied to drums fitted to the wheels. With the higher operating speeds and heavier vehicles, and particularly in vehicles equipped with smaller diameter brake drums, necessitated by the smaller wheels used with low pressure tires, the braking system of the vehicle is required to function under much more severe operating conditions than was heretofore necessary.

With the higher operating speeds on superhighways, and toll highways, the distance required to bring the vehicle to a full stop from high operating speeds is of necessity extremely great.

The result is that even minor accidents on these highways frequently cause large numbers of vehicles to collide with one another due to the fact that the road is blocked by one or more vehicles involved in a collision, or disabled for any other reason.

In vehicles equipped with hydraulic brakes, even a slight leak in any of the lines leading from the master cylinder to the wheel cylinders, or a defective or leaking master cylinder will render the entire braking system ineffectual, thus causing serious injuries and frequently loss of life, due to the inability of the motorist to stop the vehicle.

The primary object of my invention is to provide an attachment which serves as an auxiliary emergency braking mechanism, which may be automatically actuated when an emergency braking application is made by the driver, or which can be manually applied by the driver if he finds an emergency stopping of the vehicle necessary.

A major feature of the construction is that it can be utilized either in conjunction with or independently of the conventional braking system with which the vehicle is equipped in order to bring the vehicle to a stop in a relatively short distance.

Another feature of the construction is that it provides an auxiliary braking device which can be utilized to either prevent skidding or to hold the vehicle in position after it has started to skid and arrest further skidding due to the greater area in contact with the road surface, when a vehicle is driven on wet or icy pavements.

Another feature of the construction is that the braking mechanism can be applied automatically in conjunction with the conventional hydraulic braking system, thus avoiding any special action on the part of the driver.

Another feature of the construction is that the driver may manually control the auxiliary braking mechanism and apply it to the vehicle simultaneously with the application of the conventional brakes in an emergency or when the conventional braking system fails to operate for any reason.

Another feature of the construction is that the entire braking mechanism is automatically retracted and drawn completely clear of the wheels and road obstructions when the auxiliary braking mechanism is released by the driver.

The accompanying drawings, illustrative of one embodiment of my invention, together with the description of its construction and the method of mounting, operation, actuation and utilization thereof, will serve to clarify further objects and advantages of my invention.

In the drawings:

Fig. 1 represents a partial section and partial side elevation of the assembled auxiliary braking mechanism supported by the rear portion of the frame and the rear axle housing of a vehicle, with the auxiliary braking mechanism shown in its operating position, the auxiliary braking mechanism and the actuating mechanism therefor being shown in their retracted position in dot-dash lines, the section being taken on the line 1—1, Fig. 2.

Fig. 2 is a plan view of the auxiliary braking attachment shown in Fig. 1, attached to the rear portion of the chassis of a motor vehicle, showing the method of supporting the auxiliary brake shoes from the frame side members of the vehicle and the method of supporting the air operated control cylinder on the housing of the rear axle thereof.

Fig. 3 is a front elevation of the auxiliary braking mechanism shown in Figs. 1 and 2, showing the relation of the auxiliary side and cross-brake shoes to the wheels of the vehicle, and the compressed air operated control cylinders mounted adjacent the ends of the side sections of the rear axle housing, taken on the line 3—3, Fig. 2.

Fig. 4 is a rear elevation of the auxiliary braking mechanism shown in Figs. 1 and 2, showing the position of the auxiliary side brake shoes relative to the vehicle rear wheels, also the rear links connecting the auxiliary side brake shoes to the frame side members of the vehicle, and the angularly positioned cross-braces connecting the frame cross-member to the rear links supporting the auxiliary brake shoes.

Figure 5:
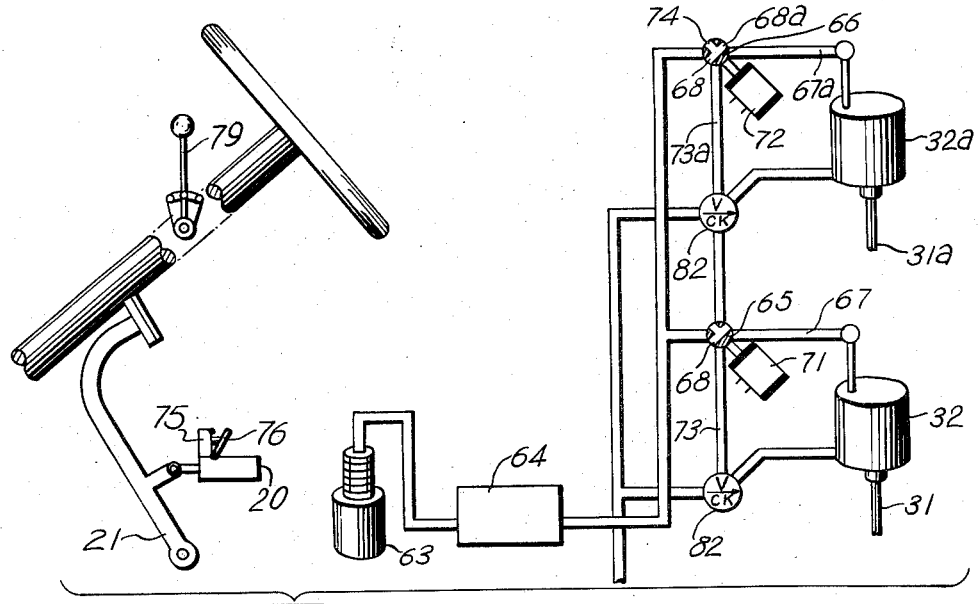

Fig. 5 is a schematic partial side elevation and partial perspective of the actuating mechanism of the auxiliary braking mechanism shown in Figs. 1 and 2, showing the hydraulically operated pressure control valve attached to the hydraulic brake master cylinder, the piping connecting the air compressor to the compressed air operated control cylinders, and the solenoid operated valves which regulate the flow of air to and from the control cylinders.

Figure 6:
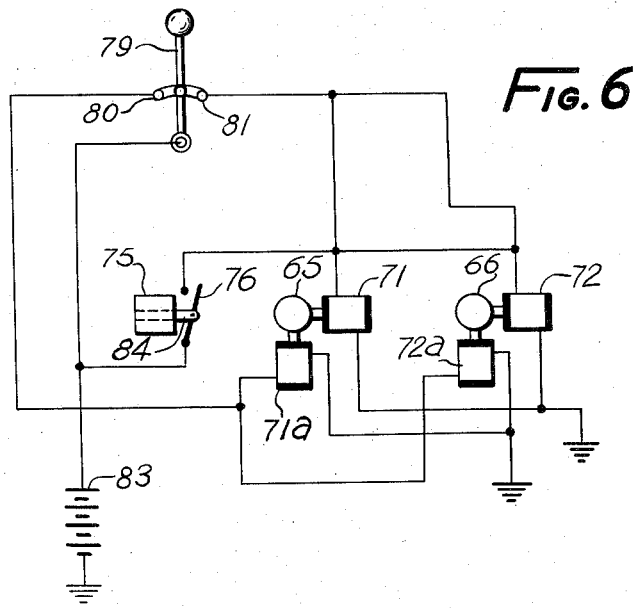

Fig. 6 is a schematic wiring diagram of the control mechanism of the auxiliary braking mechanism, shown in Fig. 5, showing the method of controlling the flow of current to the solenoids of the solenoid operated air valves, including the automatically and manually operated switches provided to energize the valve solenoids.

It will be understood that the following description of the construction and the method of operation, mounting and utilization of the Auxiliary Safety Braking Attachment is intended as explanatory of the invention and not restrictive thereof.

In the drawings, the same reference numerals designate the same parts throughout the various views, except where otherwise indicated.

One embodiment of the auxiliary braking mechanism shown in Figs. 1, 2 and 3 is mounted on the rear portion of the chassis of a motor vehicle, which consists of a frame having a pair of side members 11 and 11a, a pair of leaf springs 12 and 12a supported by the rear portion of the frame supporting the rear axle, which consists of a substantially tubular housing, with an enlarged central section 15 in which the drive gears and differential are mounted, supporting or integral with the tubular side sections 16, 16a of the housing.

A pair of wheels 17, 17a is supported by the drive shafts 18, at the center of the rear axle housing, each of the wheels having a substantially cylindrical brake drum 19, 19a attached thereto, the braking mechanism fitted to the interior of the brake drums being actuated, in a hydraulic braking system, by individual wheel cylinders mounted on the braking mechanism at the inner open side of each drum, the wheel cylinders being actuated by oil under pressure which flows from a brake master cylinder 20, shown in Fig. 5, which is in turn controlled by a foot pedal 21, which is pressed angularly downward by the operator of the vehicle, the foot pedal being connected to the piston of the brake master cylinder 20 by a piston rod, which is provided to build up the required hydraulic pressure within the master cylinder by longitudinally moving the piston along the master cylinder axis, the pressure being transmitted to individual wheel cylinders mounted on each of the wheel brakes by a plurality of tubes (not shown).

The auxiliary braking mechanism shown in Figs. 1, 2, and 3 comprises a pair of substantially rectangular auxiliary shoes 23 and 23a, mounted below the rear axle of the vehicle, substantially parallel to the longitudinal axis thereof, each of the shoes being mounted a short distance inside one of the adjacent frame side members, each auxiliary shoe being located substantially parallel to the frame side member and a short distance inside the adjacent rear spring 12, 12a in order to clear the rear spring when the auxiliary shoe is elevated to the retracted position shown by dot-dash lines, Fig. 1.

The lower face of each of the auxiliary shoes 23 and 23a has a rubber or other type of tread 24, 24a affixed thereto, the bottom surface of the tread being corrugated or having other type of roughened surface formed thereon in order to increase the frictional resistance when the auxiliary shoes are lowered to the braking position shown in Fig. 1.

The rear end of each of the auxiliary shoes is supported by a rear link 26, which is angularly positioned relative to the frame side member, the upper end of each rear link 26 being supported by a bracket 27, 27a attached to and projecting beyond the inner face of the frame side member, the end of the bracket, located a short distance from the frame side member, having a circular stud integral therewith or attached thereto, the stud 28 pivotally supporting the upper end of the link.

The lower end of each rear link is supported by a bracket attached to the upper surface of the auxiliary shoe, each bracket having a pair of integral ears 29, 29a which are parallel to each other, and substantially perpendicular to the upper surface of the auxiliary shoe, each of the brackets supporting a pivot pin 30, which pivotally supports the lower end of the rear link 26.

The forward portion of each auxiliary shoe is supported by the piston rod 31, 31a of a compressed air operated cylinder 32, 32a, each of the cylinders being mounted forward of the rear axle and rotatably attached to the adjacent tubular side section 16, 16a of the rear axle in the manner shown in Figs. 1 and 2.

The outer circumference of each of the tubular side sections 16, 16a of the rear axle has a tubular sleeve 33 attached thereto, and surrounding the outer surface thereof, a plain bearing 34 made of bronze, or other suitable anti-friction material surrounding each sleeve 33. The plain bearing may be split along the longitudinal centerline thereof or otherwise constructed in such a manner as to facilitate mounting on the tubular sleeve 33.

A tubular bearing support member 35 is mounted around the outer surface of the plain bearing 34 and attached thereto. The bearing support members may also be split along the longitudinal centerline thereof in the same manner as the plain bearing 34, each section of the bearing support member having a pair of substantially semi-circular flanges 36, 36a or 37, 37a attached thereto, the two pair of flanges attached to each pair of bearing support member sections aligning the plain bearing with the tubular sleeve 33 attached to the tubular side section 16, 16a of the rear axle housing.

In place of the tubular plain bearing 34, shown in Figs. 1 and 2, a needle bearing or other type of anti-friction radial bearing may be substituted, the operation of the unit remaining substantially the same.

A pair of upper straps 38, 38a is attached to the outer circumference of the bearing support member 35, or the end flanges 36 and 36a attached thereto, the straps 38 and 38a which surround the upper portion of each air cylinder 32, 32a each having a projecting flange 39, 39a integral with the forward end thereof, a bolt or other suitable clamping means being fitted through the strap flanges 39 and 39a in order to clamp the straps to the air cylinder, thereby fixedly attaching each air cylinder to the tubular bearing support member 35.

A similar pair of lower straps 40, 40a of rectangular cross-section is fixedly attached to the outer circumference of each bearing support member, or to the two end flanges 36 and 36a attached thereto, the lower straps 40 and 40a which surround the lower portion of each of the air cylinders in the same manner as the upper straps, each having a projecting flange 41, 41a integral therewith, the two flanges being clamped to one another in the same manner as the flanges of the upper straps, thus supporting the air cylinder against the rear axle side section.

As the two pair of straps 40 and 40a are fixedly attached to the bearing support member or to the end flanges 36 and 36a attached thereto, the two straps cause the bearing support members to rotate through an angle, when the air operated cylinder is moved from the angular position shown by dot-dash lines, Fig. 1, to the extended or operating position shown in Fig. 1, in which the cylinders are substantially perpendicular to the auxiliary brake shoes 23, 23a.

In order to retain the auxiliary brake shoes 23 and 23a in a position substantially parallel to the frame side members, each of the rear links 26, 26a is supported by a reduced diameter stud 38 integral with the outer end of a bracket 27, 27a, a hub integral with the upper end of the rear link being trunnioned on the stud 28 of the bracket. As the axis of the stud 28 is substantially perpendicular to the frame side member 11, and the rear links 26, 26a are initially parallel to the frame side members 11, 11a, the rear links 26, 26a are maintained in a parallel relation to the frame side members 11, 11a regardless of the angular relation of the axis of the rear links 26, 26a to the road surface. A pair of cross-braces 42, 42a is mounted between the frame cross-member 43 mounted behind the rear axle and fixedly attached to the frame side members, and one of the rear links 26 or 26a the cross-members being operative to reinforce the rear links 26, 26a, regardless of the angular relation of the axis of the rear links 26, 26a to the road surface. The upper end of each of the cross-braces 42, 42a has a ball end 44 integral with or attached thereto, the ball end being supported by a spherical segmental seat of mating contour formed in the inner surface of a bracket 45 fixedly attached to the cross-member, a short distance from the longitudinal centerline of the chassis. In place of the ball joint shown in Fig. 2, any other suitable type of universal joint, which enables the cross-braces to be moved through the required angular range may be substituted the diagonal cross-braces 42, 42a being located in substantially the same relation to the frame side members 11, 11a and the rear links 26, 26a as that shown in the drawings, the diagonal cross-members functioning in substantially the same manner.

The lower end of each of the cross-braces has a reduced diameter cylindrical section 46 integral therewith, the cylindrical section being slidably supported by a tubular guide sleeve 47, slidably fitted to the rear link. A pair of cylindrical pivot members 47a, fixedly attached to the tubular guide sleeve and projecting beyond the sides thereof, the pivot members being located on diametrically opposite sides of the tubular guide sleeves, and located on an axis substantially perpendicular to the longitudinal axis of the tubular guide sleeve 47, is slidably fitted to and supported by a pair of long parallel-faced slots 48, cut through the outer walls of the rear link, thereby enabling the cross-braces 42, 42a to be moved from the operating position shown in Fig. 1 to the retracted position shown by dot-dash lines, Fig. 1, the rear link being moved from the operating position shown in Fig. 1, to the retracted position shown by dot-dash lines, Fig. 1. When the brake shoes 23, 23a are elevated by the coiled springs 50, from the operating position shown in Fig. 1, to the retracted position, shown by dot-dash lines, Fig. 1. The rear links 26, which are pivotally supported by the frame side members, are moved angularly upward to the position shown by dot-dash lines, Fig. 1. The parallel relation between the longitudinal axis of the vehicle and the rear links 26, 26a being maintained by the studs 28, 28a integral with the brackets 27, 27a and the hubs of the rear links, to which the studs 28 are individually fitted. The ball joint shown at the top of each cross-brace 42 and the guide sleeve 47 and the slotted link 26 enable the relative angular positions of the rear link and the cross-brace shown in Figs. 1 and 2, to be moved from their retracted position shown by dot-dash lines, Fig. 1, to the operating position shown in Figs. 1 and 2. The parallel relation between the rear links 26, 26a and the longitudinal axis of the vehicle chassis being maintained by the stud and hub combination in the manner hereinbefore described.

The pivot members 47a inserted into and attached to the sleeves 47, 47a are moved upward along the slot 48, through the rear link 26, 26a, the guide sleeve being simultaneously rotated through an angle about the cylindrical section 46 of each of the cross-braces, to maintain the pivot members 47a within the slots 48.

As the sleeve 47 is moved along the cylindrical section of the cross-brace, and simultaneously rotated through a relatively small angle, the pivot members engage the parallel sides of the slot 48, through the rear link. This action coupled with the frictional resistance between the guide sleeve 47, against the cylindrical section 46 of each of the cross-braces, tends to resist axial movement of the guide sleeve along the cylindrical section 46, when the brake shoe is moved into the braking position, shown in Fig. 1.

The angular relation between the cross-braces 42, 42a, and the rear links 26, 26a, as shown in Fig. 4, plus the variation in angular movement thereof, as shown in Fig. 1, accentuate this resistance, so that when the brake shoe is moved against the road surface, by the action of the piston rod 31 of the air cylinder, this resistance to axial movement of the guide sleeve 47, relative to the cylindrical section 46 of each of the cross-braces 42, 42a, is accentuated by the pressure of the brake shoe 24 against the road surface, the brake shoe being retained in its outer or braking position by the air cylinder 32, 32a.

On a substantially flat road surface, when the piston rod of the air cylinder moves the brake shoe to the position shown in Fig. 1, there is a tendency for the forward portion of the brake shoe to be elevated slightly, thus causing the rear portion of each brake shoe to which the integral ears 29, 29a of the bracket attached to the brake shoe to be moved downward toward the road surface, about the pivot member which connects the brake shoe to the piston rod 31, 31a.

The limiting movement of the rear portion of the brake shoe about the pivot pin attached to the piston rod 31a, is controlled by the disc or washer, 49 which is threadably or otherwise attached to the outer end of the cylindrical section 46 of each of the cross-braces 42, 42a. A tubular washer or disc 49 is threadably or otherwise attached to the outer end of the cylindrical section of each of the cross-braces, to limit the outward movement of the rear link 26, 26a and consequently the downward movement of the brake shoe attached thereto, the diagonal cross-braces 42, 42a reinforcing the rear links in all angular positions thereof the rear links being reinforced by the diagonal cross-braces, which are adjustably fitted thereto.

A coiled tension rear spring 50 is mounted between the rear portion of each frame side member 11, 11a and the rear portion of the mating auxiliary shoe 23, 23a. The looped upper end of the rear spring 50 is pivotally supported by a bracket 51 attached to the inner face of each frame side member and projects inward therefrom, each bracket having a short stud integral with or attached thereto, with a short cylindrical retainer section 52, attached to the outer end of the stud section to retain the looped end of the rear spring on the stud.

The lower end of the rear spring 50, which is also looped, is pivotally supported by a bracket attached to the upper surface of the mating auxiliary shoe, each bracket having a pair of integral ears 53 which project upward from the shoe, the ears having aligned openings therethrough, through which a pin or screw 54 may be inserted to support the looped end of the rear spring.

The upper end of the rear spring 50 is located forward of the lower end thereof, the spring assuming an angular position relative to the frame side members.

A similar longer forward extension spring 56 is mounted between the forward portion of each auxiliary brake shoe, ahead of the air cylinder 32, 32a as shown in Fig. 1, and the inner surface of the frame side member, forward of the point of attachment to the shoe. The looped upper end of the forward spring 56 is supported by a bracket 57 fixedly attached to the inner face of the frame side member and projecting inward therefrom, the bracket having a stud integral with the outer end thereof, with a short retainer section fixedly attached to the stud to retain the looped upper end of the forward spring 56 on the stud, in the same manner as the rear spring 50.

The forward spring 56 which is considerably longer than the rear spring, is oriented at a much flatter angle relative to the frame side member in the extended or operating position shown in Fig. 1. The forward spring is also made heavier than the rear spring so that it exerts a stronger pull on the auxiliary brake shoe when the piston and the piston rod 31, 31a of the air cylinder are released. The greater tension of the forward spring 56 and the relatively small mounting angle thereof exert a relatively strong pull on the auxiliary brake shoe, the high horizontal component of the spring force drawing the shoe forward from the operating position shown in Fig. 1 to the retracted position shown in dot-dash lines, Fig. 1, the force of the spring causing the air cylinder 32, 32a to be angularly displaced from the substantially vertical position shown in Fig. 1, to the angular position shown by dot-dash lines, Fig. 1, when the auxiliary shoe is retracted by releasing the air in the upper portion of the cylinder and by injecting compressed air into the lower portion thereof in a manner hereinafter described in greater detail.

The forward end 59 of each of the auxiliary shoes 23, 23a is curved upward slightly to clear any obstructions, which may be present on the road surface and to facilitate locating the gripping surface of each shoe in a position in alignment with the road surface if the shoe is tilted for any reason, during the downward movement thereof.

The rear end of each of the auxiliary shoes is also curved upward to a lesser extent than the forward end thereof.

An intermediate or cross-shoe 60 is located between the auxiliary shoes 23 and 23a adjacent the rear end thereof, the ends of the intermediate shoe being welded or otherwise fixedly attached to the adjacent surfaces of the auxiliary shoes 23 and 23a.

The rear end of the cross-shoe is curved upward slightly in the same manner as the auxiliary shoes 23 and 23a.

The bottom surface of the intermediate shoe has a sheet of gripping material attached to the lower surface thereof, the bottom surface of the gripping material being corrugated or otherwise roughened to facilitate gripping the road surface.

A rubber bumper 61, is attached to the upper surface of each of the auxiliary shoes 23, 23a to limit the upward movement of the auxiliary shoe, the bumper engaging a stop 62 attached to the bottom of the frame side member 11, 11a if the shoe is raised beyond its normal retracted position shown by dot-dash lines, Fig. 1.

Fig. 5 shows the control mechanism provided to lower the shoes into their braking position shown in Fig. 1.

The air required to actuate the two air cylinders 32, and 32a shown in Fig. 1 is supplied by an air compressor 63 which may be driven by the engine of the vehicle, the compressed air from the compressor being discharged into a storage tank 64.

From the storage tank, the air is fed through a conduit to a pair of 3-way solenoid-controlled valves 65, 66 from which the air may be fed through the upper conduits 67, 67a to the upper end of the air cylinders 32 and 32a in order to force each of the pistons and the piston rods 31, 31a downward when two of the passages 68 and 68a through the rotor of the three-way valve are rotated into a horizontal position in alignment with the upper conduits 67, 67a.

The three-way valve may be controlled by a single or multiple solenoid coil 71, 72, the plunger of which is connected to the valve rotor by a linkage or other suitable means, or a rotary solenoid having a rotating mechanism incorporated therewith may be substituted therefor, the solenoid rotating mechanism being operative to rotate the control member of rotor of the valve into one of three positions, the first open position with the passage 68, 68a through the valve in alignment with the upper conduit 67, 67a, a second open position in which one of the passages 68 through the valve rotor is aligned with and in communication with the lower conduit 73, 73a, the air being fed to the passage 68 through a third passage 74 in the valve rotor which is in communication with the inlet conduit, which is in turn connected to the air compressor storage tank 64. In a third solenoid position, the valve rotor is rotated into a position substantially as shown in Fig. 5, with the valve closed, none of the rotor passages being in communication with the conduits.

The solenoids 71 and 72 may be energized in one of two ways, as shown in Figs. 5 and 6. In the automatic operation of the unit, the oil pressure from the hydraulic brake master cylinder 20, from which the oil under pressure is supplied to the wheel cylinders (not shown), passes through a pressure controlled valve 75, which is connected to and energizes the solenoids 71 and 72 by closing a switch or relay 76, which is electrically connected to the solenoids 71 and 72 when the foot brake pedal 21, shown in Fig. 5, is suddenly forced angularly downward, as when the operator forces the pedal downward at a rapid rate in order to apply a sudden braking action to the wheels of the vehicle.

The operation of the pressure controlled valve energizes the solenoid coils 71, 72, thereby moving the valve rotor so that the passages therethrough are in communication with the upper conduit from which the air enters the upper portion of the air cylinder in order to force the piston rod downward and move the auxiliary brake shoes into the operating position shown in Fig. 1.

In order to release the auxiliary brake shoes 23 and 23a, a hand operated control lever 79 is moved forward (left-hand, Fig. 6) from the neutral position shown in Fig. 6, until a contact on the control lever engages the forward contact 80 mounted on a sector attached to the steering column, thereby closing the circuit through a pair of auxiliary solenoid coils 71a, 72a, which move each valve rotor into a position in which one passage therethrough is in communication with the lower conduits 73, 73a, connected to the lower portion of the air cylinder, which allows compressed air to enter the lower portion of the air cylinder 32, 32a, thereby raising the piston rod 31, 31a and allowing the coil springs 50 and 56 to elevate the auxiliary brake shoes 23, 23a to the retracted position shown in dot-dash lines, Fig. 1.

When the operator of the vehicle desires to manually control the auxiliary braking mechanism for any reason, the hand control lever 79 may be moved rearward to a position at which a contact attached to it engages the rear contact 81 on the sector, thereby rotating the valve rotor into a position in which the passages therethrough are in communication with the upper conduit 67, 67a connected to the upper end of the air cylinder, thereby forcing the piston rod into the operating position shown in Fig. 1, so that the passages therethrough are in communication with the upper conduit 67, 67a connected to the upper end of the air cylinder, thereby forcing the piston rod into the operating position shown in Fig. 1, in substantially the same manner as the automatic operation hereinbefore described.

A check valve 82 is connected to the lower conduit leading to the lower portion of the air cylinder 32, 32a, the check valve being so constructed as to allow compressed air to enter the lower portion of the air cylinder from the lower conduit 73, 73a, when the lower conduit is connected to the valve rotor passage, the check valve 82 also allowing air from the lower portion of the air cylinder to be discharged therethrough into the atmosphere when the valve rotor passage 68, 68a is in communication with the upper portion of the air cylinder 32, 32a.

When the piston rods 31, 31a are forced downward into the operating position shown in Fig. 1, each air cylinder and the piston rod fitted thereto assume a position substantially perpendicular to the auxiliary brake shoes, as shown in Fig. 1.

When the piston and piston rod are raised by forcing air into the lower portion of the air cylinder, the piston rod is first moved upward within the air cylinder, thereby allowing the tension springs 50 and 56 to elevate the brake shoes 23, 23a to the retracted position shown in dot-dash lines, Fig. 1.

In this position, the air cylinder 32, 32a and the piston rod 31, 31a fitted thereto are rotated into an angular position as shown by dot-dash lines, Fig. 1, by angularly moving the air cylinder about the tubular bearings 34 fitted to the rear axle housing tubular side sections.

Fig. 6 shows the wiring circuit of the auxiliary brake actuating mechanism shown in Fig. 5.

In place of the single coil 71 or 72 attached to each of the valves 65 or 66, as shown in Fig. 6, a pair of coils 71, 71a, or a multiple coil may be attached to each of the control valves to enable the valve rotor to be moved into one of the three operating positions hereinbefore described.

The current to operate the solenoid coils is supplied by a battery 83 from which it is fed to the relay or switch 76 controlled by the hydraulic pressure-actuated plunger 84 fitted to the hydraulic pressure chamber attached to the master brake cylinder 20 shown in Fig. 5. From the pressure-controlled switch or relay, the current flows to the two solenoids 71 and 72 attached to the valve rotor, thereby allowing air to enter the upper portion of the air cylinder and forcing the piston rod downward into the operating position shown in Fig. 6.

The solenoid coils 71 and 72 may also be energized in the same manner when the hand control lever 79 is moved angularly rearward until the current flows through the rear contacts 81 to the solenoid coils 71 and 72, thereby operating the valve rotor and moving the piston rod downward in substantially the manner hereinbefore described.

In order to release the braking mechanism, the hand control lever 79 is moved angularly forward until it engages the forward contact 80, thereby energizing the auxiliary solenoid coils 71a and 72a and rotating the valve rotor until the passages therethrough are in communication with the lower conduits 73 and 73a, thereby allowing air to enter the lower portion of the air cylinder, thus elevating the piston rod to the retracted position, shown by dot-dash lines, Fig. 1.

While represented as two coils attached to each of the valve rotors in the wiring diagram shown in Fig. 5, a single solenoid coil, or a multiple coil connected for multiple operation, or a rotary solenoid constructed in such a manner as to provide selective multiple rotation of the valve rotor may be utilized.

It will be apparent to those skilled in the art that my present invention is not limited to the specific details described above and shown in the drawings, and that various modifications are possible in carrying out the features of the invention and the operation, actuation, and method of mounting and utilization thereof, without departing from the spirit and scope of the appended claims.

What I claim is:

1. In combination with a motor vehicle having a frame including a pair of side members with a cross-member attached to and connecting a portion of said side members substantially perpendicular thereto, a rear axle supported by the frame, the housing of said rear axle having a pair of tubular side sections substantially perpendicular to the frame side members, and a pair of driving wheels supported by the rear axle; an auxiliary braking mechanism comprising a pair of auxiliary brake shoes of substantially rectangular contour mounted below the frame side members, a rear link pivotally attached to each of said frame side members, a major portion of the braking surface of each of said brake shoes being substantially flat, and parallel to one frame side member, the flat portion of each brake shoe being operative to engage the road surface over substantially its entire length, supporting the rear portion of each of the auxiliary brake shoes, a pair of pivot brackets attached to the frame cross-members, a compressed air-operated control cylinder pivotally supported by each of the rear axle housing side sections above each of said auxiliary brakes shoes, each air-operated control cylinder being supported by a pair of straps attached to a tubular bearing support member, said bearing support member being trunnioned directly on one of the rear axle housing tubular side sections, each of said control cylinders having a piston and a piston rod reciprocatingly fitted thereto, the outer end of each of said piston rods being pivotally attached to a bracket fixedly attached to the adjacent auxiliary brake shoe, a compressed air supply source connected to each of said control cylinders, a fluid pressure control valve mechanism fitted to the hydraulic master cylinder operative to control the flow of air to each of the control cylinders to force the piston rod into the auxiliary braking position, each control cylinder piston rod being operative to force one of the auxiliary brake shoes against the road surface, when the piston rod is moved outward by compressed air supplied to the piston end of the control cylinder, a manually operated control lever pivotally attached to the motor vehicle, means controlled by the control lever adapted to release air from the piston end of the control cylinder and allow compressed air to enter the piston rod end of each control cylinder to draw the piston rod into the control cylinder, and a plurality of extension spring members connecting each of the frame side members with the mating auxiliary brake shoe to draw the auxiliary brake shoe into a retracted position when the piston rod is drawn into the air cylinder.

2. In combination with a motor vehicle having a frame including a pair of side members, a rear axle supported by the frame, the housing of the rear axle having a pair of tubular side sections substantially perpendicular to the frame side members, a pair of driving wheels supported by the rear axle, and an operator controlled hydraulic master cylinder operative to control the vehicle braking mechanism; an auxiliary braking mechanism comprising a pair of auxiliary brake shoes of substantially rectangular contour mounted below the frame side members, the major portion of the braking surface of each of said brake shoes being substantially flat and parallel to one of the frame side members, the flat portion of each of said brake shoes being operative to engage the road surface over substantially its entire length, a rear link pivotally attached to each of said frame side members supporting the rear portion of each of said auxiliary brake shoes, a compressed air-operated control cylinder pivotally supported by each of the rear axle housing side sections above each of said auxiliary brake shoes, each air-operated cylinder being supported by a pair of straps fixedly attached to a tubular bearing support member, said bearing support member being trunnioned directly on one of the rear axle housing tubular side sections, each of said control cylinders having a piston and a piston rod reciprocatingly fitted thereto, the projecting end of each of said piston rods being pivotally attached to a bracket fixedly attached to the adjacent auxiliary brake shoe, a compressed air supply source connected to each of said control cylinders, a fluid pressure control valve mechanism fitted to the hydraulic master cylinder operative to control the flow of compressed air to each of the control cylinders, each control cylinder piston rod being operative to force one of the auxiliary brake shoes against the road surface when the piston rod is forced outward by compressed air supplied to the control cylinder, and a plurality of extension springs connecting each of the frame side members with the mating auxiliary brake shoe to draw the auxiliary brake shoe into a retracted position when the mating piston rod is drawn into the air cylinder by the release of the air pressure against the piston.

3. In combination with a motor vehicle having a frame including a pair of side members, a rear axle supported by the frame, the housing of the rear axle having a pair of tubular side sections substantially perpendicular to the frame side members, a pair of driving wheels supported by the rear axle, each of said driving wheels having a hydraulically operated braking mechanism fitted thereto, and an operator controlled hydraulic master cylinder operative to control the wheel braking mechanism; an auxiliary braking mechanism comprising a pair of auxiliary brake shoes of substantially rectangular contour mounted below the frame side members, a major portion of the braking surface of each of said brake shoes being substantially flat, and parallel to one frame side member, the flat portion of each brake shoe being operative to engage the road surface over substantially its entire length, the lower face of each of said auxiliary brake shoes having a tread made of a compressible material attached thereto, a rear link pivotally attached to each of said frame side members supporting the rear portion of each of said auxiliary brake shoes, a compressed air-operated control cylinder pivotally supported by each of the rear axle housing side sections above each auxiliary brake shoe, each air-operated control cylinder being supported by a pair of straps, attached to a tubular bearing support member, said bearing support member being trunnioned directly on one of the rear axle housing tubular side sections, each of said control cylinders having a piston and a piston rod reciprocatingly fitted thereto, the projecting end of each of the piston rods being pivotally attached to a bracket fixedly attached to the adjacent auxiliary brake shoe, a compressed air supply source connected to each of said control cylinders, a fluid pressure control valve mechanism fitted to the hydraulic master cylinder operative to control the flow of air to each of the control cylinders to force the piston rod into the auxiliary braking position, each control cylinder piston rod being operative to force one of the auxiliary brake shoes against the road surface when the piston rod is moved outward by compressed air supplied to the piston end of the control cylinder, a manually operated control lever pivotally attached to the motor vehicle, means controlled by the control lever operative to release air from the piston end of the control cylinder and allow compressed air to enter the piston rod end of each control cylinder to draw the piston rod into the control cylinder, and a plurality of extension springs connecting each of the frame side members with the mating auxiliary brake shoe, the extension springs being operative to draw the auxiliary brake shoe into a retracted position when the piston rod is drawn into the air cylinder by the release of the air pressure above the piston therein.

4. In combination with a motor vehicle having a frame including a pair of side members, a rear axle supported by the frame, the housing of the rear axle having a pair of tubular side sections substantially perpendicular to the frame side members, a pair of driving wheels supported by the rear axle, and an operator controlled hydraulic master cylinder operative to control the vehicle braking mechanism; an auxiliary braking mechanism comprising a pair of substantially flat auxiliary brake shoes mounted below the frame side members, the lower face of said auxiliary brake shoes having a tread made of a compressible material attached thereto, the braking surface of each of said brake shoes being substantially parallel to the longitudinal axis of the vehicle, the flat tread portion of each of said brake shoes being operative to engage the road surface over substantially its entire length, a rear link pivotally attached to each of said frame side members supporting the rear portion of each of said auxiliary brake shoes, a pair of tubular bearings rotatably mounted on each of the rear axle housing side sections above each auxiliary brake shoe, a bearing support member surrounding each of said tubular bearings, an air operated control cylinder mounted in substantially central alignment with each of said tubular bearings, the longitudinal axis of each of said control cylinders being substantially perpendicular to the longitudinal tubular bearing axis, means attached to each of said bearing support members supporting the mating control cylinder to allow each control cylinder to be angularly moved about the tubular rear axle housing side section, said support means being trunnioned directly on one of the tubular rear axle housing side sections, each of said control cylinders having a piston and a piston rod reciprocatingly fitted thereto, the projecting end of each of said piston rods being pivotally attached to a bracket fixedly attached to the adjacent auxiliary brake shoe, a compressed air supply source connected to each of said control cylinders, a fluid pressure controlled valve mechanism fitted to the hydraulic master cylinder operative to regulate the flow of air to each of the control cylinders to force the piston rod into the auxiliary braking position, each control cylinder piston rod being operative to force one of the auxiliary brake shoes against the road surface when the piston rod is moved outward by compressed air supplied to the piston end of the control cylinder, manually controlled means operative to release the compressed air from the piston end of each control cylinder and allow compressed air to enter the piston rod end of each control cylinder to draw the piston rod into the control cylinder, and a plurality of extension springs connecting each of the frame side members with the mating auxiliary brake shoe, the extension springs being operative to draw the auxiliary brake shoe into a retracted position when the piston rod is drawn into the air cylinder by the release of the air pressure above the piston therein.

5. In combination with a motor vehicle having a frame including a pair of side members, a rear axle flexibly supported by the frame, the housing of the rear axle having a pair of tubular side sections substantially perpendicular to the frame side members, a pair of driving wheels supported by the rear axle, and an operator controlled hydraulic master cylinder operative to control the vehicle braking mechanism; an auxiliary braking mechanism comprising a pair of auxiliary brake shoes of substantially rectangular contour mounted below the frame side members, the lower face of each of said auxiliary brake shoes having a tread made of a compressible material attached thereto, a major portion of the tread of each of said brake shoes being substantially flat and parallel to the longitudinal axis of the vehicle, the flat portion of each of said brake shoe treads being operative to engage the road surface over substantially its entire length, a rear link attached to each of said frame side members supporting the rear portion of each of said auxiliary brake shoes, a compressed air operated control cylinder pivotally supported by each of the rear xle housing side sections above each auxiliary brake shoe, each of said air-operated cylinders being supported by a pair of straps fixedly attached to a tubular bearing support member, said support member being trunnioned directly on one of the rear axle housing tubular side sections, each of said control cylinders having a piston and a piston rod reciprocatingly fitted thereto, the projecting end of each piston rod being pivotally attached to a bracket fixedly attached to the adjacent auxiliary brake shoe, a compressed air supply source connected to each of said control cylinders, a fluid pressure controlled valve mechanism fitted to the hydraulic master cylinder operative to control the flow of air to each of the control cylinders to force the piston rod into the auxiliary braking position, the piston rod of each control cylinder being operative to press one of the auxiliary brake shoes against the road surface when the piston rod is moved outward by compressed air supplied to the piston end of the control cylinder, a manually operated control lever pivotally supported by the motor vehicle, means regulated by the control lever in one angular position thereof operative to release air from the piston end of the control cylinder and allow compressed air to enter the piston rod end of each control cylinder to draw the piston rod into the control cylinder, means regulated by the control lever in another angular position thereof operative to allow compressed air to enter the piston end of each control cylinder to selectively force the piston rod thereof into the auxiliary braking position, and a plurality of extension springs connecting each of the frame side members with the mating auxiliary brake shoe, the extension springs being operative to draw the attached auxiliary brake shoe into a retracted position when the piston rod is drawn into the control cylinder by the release of the air pressure above the piston therein.

6. In combination with a motor vehicle having a frame including a pair of side members, a rear axle supported by the frame, the housing of the rear axle having a pair of tubular housing side sections substantially perpendicular to the frame side members, a pair of driving wheels supported by the rear axle, and an operator controlled hydraulic master cylinder operative to control the vehicle braking mechanism; an auxiliary braking mechanism comprising a pair of auxiliary brake shoes mounted below the frame side members, the bottom surface of each of said auxiliary brake shoes being substantially flat, with the forward and rear ends of each of said auxiliary brake shoes curved upward, each of said brake shoes being substantially parallel to the longitudinal axis of the vehicle, the flat portion of each of the brake shoes being operative to engage the road surface over substantially its entire length, a rear link pivotally attached to each of said frame side members supporting the rear portion of each of said auxiliary brake shoes, the lower end of each of said rear links being pivotally attached to the adjacent auxiliary brake shoe, each rear link being angularly positioned relative to the auxiliary brake shoe bottom surface, the upper end of each rear link being located rearward of the lower end thereof, a pair of tubular bearings rotatably mounted on each of the rear axle housing side sections above each auxiliary side brake shoe, a bearing support member surrounding each of said tubular bearings, an air-operated control cylinder mounted in substantially central alignment with each of said tubular bearings, the longitudinal axis of each of said control cylinders being substantially perpendicular to the longitudinal bearing axis, means attached to each of said bearing support members supporting the mating control cylinder to allow each control cylinder to be angularly moved about the tubular rear axle side section, each of said control cylinders having a piston and a piston rod reciprocatingly fitted thereto, the projecting end of each of said piston rods being pivotally attached to a bracket fixedly attached to the adjacent auxiliary brake shoe, a fluid pressure controlled valve mechanism fitted to the master hydraulic cylinder operative to control the flow of air to each of the control cylinders to force the piston rod into the auxiliary braking position, manually operated control means operative to release the compressed air from the piston end of the control cylinder to draw the piston rod into the control cylinder, and a plurality of extension springs connecting each of the frame side members with the mating auxiliary brake shoe, the extension springs being operative to draw each auxiliary brake shoe into a retracted position when the piston rod is drawn into the control cylinder.

7. In combination with a motor vehicle having a frame including a pair of side members with a crossmember attached to and connecting a portion of said side members substantially perpendicularly thereto, a rear axle supported by the frame, the housing of said rear axle having a pair of tubular side sections substantially perpendicular to the frame side members, and a pair of driving wheels supported by the rear axle; an auxiliary braking mechanism comprising a pair of auxiliary brake shoes of substantially rectangular contour mounted below the frame side members, the bottom of each of said auxiliary brake shoes being substantially flat, with the forward and rear ends of each of said auxiliary brake shoes curved upward, the bottom surface of each of said auxiliary brake shoes having a tread made of a compressible material attached thereto, each of said brake shoes being substantially parallel to the longitudinal axis of the vehicle, the flat portion of the tread of each of said brake shoes being substantially parallel to the longitudinal axis of the vehicle, the flat portion of the tread of each of said brake shoes being operative to engage the road surface over substantially its entire length, a rear link pivotally attached to each of said frame side members supporting the rear portion of each of the auxiliary brake shoes, the lower end of each of said rear links being pivotally attached to the adjacent auxiliary brake shoe, each rear link being angularly positioned relative to the auxiliary brake shoe bottom surface, the upper end of each rear link being located rearward of the lower end thereof, a pair of pivot brackets attached to the frame cross-member, a compressed air-operated control cylinder pivotally supported by each of the rear axle housing side sections above each of said auxiliary brake shoes, each air-operated cylinder being supported by a pair of straps fixedly attached to a tubular bearing support member, said bearing support member being trunnioned directly on one of the rear axle housing tubular side sections, each of said control cylinders having a piston and a piston rod reciprocatingly fitted thereto, the outer end of each of said piston rods being pivotally attached to a bracket fixedly attached to the adjacent auxiliary brake shoe, each control cylinder piston rod being operative to force one of the auxiliary brake shoes against the road surface, a manually operated control lever pivotally supported by the motor vehicle, means regulated by the control lever in one angular position thereof adapted to release air from the piston end of the control cylinder and allow compressed air to enter the piston rod end of each control cylinder to draw the piston rod into the control cylinder, means regulated by the control lever in another angular position thereof operative to allow compressed air to enter the piston end of each control cylinder to selectively force the piston rod thereof into the auxiliary braking position, and a plurality of extension spring members connecting each of the frame side members with the mating auxiliary brake shoe to draw the auxiliary brake shoe into a retracted position when the piston rod is drawn into the control cylinder.

8. In combination with a motor vehicle having a frame including a pair of side members, a rear axle supported by the frame, the housing of the rear axle having a pair of tubular side sections substantially perpendicular to the frame side members, a pair of driving wheels supported by the rear axle, and an operator controlled hydraulic master cylinder operative to control the vehicle braking mechanism; an auxiliary braking mechanism comprising a pair of auxiliary brake shoes mounted below the frame side members, the bottom surface of each of said auxiliary brake shoes being substantially flat, each of said brake shoes being substantially parallel to the longitudinal axis of the vehicle, the flat portion of each of said brake shoes being operative to engage the road surface over substantially its entire length, a rear link pivotally attached to each of said frame side members supporting the rear portion of each of said auxiliary brake shoes, a compressed air-operated control cylinder pivotally supported by each of the rear axle housing side sections above each of said auxiliary brake shoes, each of said air-operated cylinders being supported by a pair of straps fixedly attached to a tubular bearing support member, said bearing support member being trunnioned directly on one of the rear axle housing tubular side sections, each of said control cylinders having a piston and a piston rod reciprocatingly fitted thereto, the projecting end of each of said piston rods being pivotally attached to a bracket fixedly attached to the adjacent auxiliary brake shoe, a compressed air supply source connected to each of said control cylinders, a fluid pressure controlled valve mechanism fitted to the hydraulic master cylinder operative to control the flow of compressed air to each of the control cylinders, each control cylinder piston rod being operative to force one of the auxiliary brake shoes against the road surface when the piston rod is forced outward by compressed air supplied to the control cylinder, the piston rod of each control cylinder being substantially perpendicular to the auxiliary brake shoe in the auxiliary braking position, each control cylinder being rotated into an angular position relative to the auxiliary brake shoe when the piston rod is in its retracted position, a rear extension spring connecting the rear portion of one of said frame side members to each auxiliary brake shoe, the upper end of each of said rear extension springs being located forward of the lower end thereof, a forward extension spring mounted forward of the rear axle housing connecting each frame side member with the mating auxiliary brake shoe, the upper end of each of said forward extension springs being located forward of the lower end thereof, the longitudinal axis of the forward extension spring forming a relatively small angle with the auxiliary brake shoe in its mraking position, the forward and rear extension springs being operative to draw each of the auxiliary brake shoes forward about the upper pivoted connection of the rear link, the angular movement of the rear link being operative to simultaneously elevate the auxiliary brake shoe into a retracted position when the piston rod is drawn into the air cylinder by the release of the air pressure above the piston therein.

References Cited in the file of this patent

UNITED STATES PATENTS

| | | |
|---|---|---|
| 1,132,206 | Miller | Mar. 16, 1915 |
| 1,625,226 | Simmons | Apr. 19, 1927 |
| 2,113,056 | McKinnon | Apr. 5, 1938 |
| 2,300,725 | Cieri | Nov. 3, 1942 |
| 2,687,191 | Shannon | Aug. 24, 1954 |
| 2,695,682 | Ehlinger | Nov. 30, 1954 |
| 2,775,314 | Hiemstra | Dec. 25, 1956 |